United States Patent [19]
Milman

[11] Patent Number: 6,032,710
[45] Date of Patent: Mar. 7, 2000

[54] ELASTIC ELEMENT AND SHOCK-ABSORBING DEVICES, PARTICULARLY VEHICLE TIRES, CONSTRUCTED THEREWITH

[75] Inventor: Arnold Milman, Ra'anana, Israel

[73] Assignee: Masys Ltd., Yavne, Israel

[21] Appl. No.: 09/013,916

[22] Filed: Jan. 27, 1998

[51] Int. Cl.[7] ....................................... B60C 7/14
[52] U.S. Cl. .................. 152/285; 152/171; 152/288; 152/13; 267/1.5; 267/180
[58] Field of Search ................... 152/1, 5, 11, 12, 152/13, 69, 70, 73, 87, 92, 93, 246, 247, 248, 251, 271, 272, 273, 285, 286, 287, 288; 267/1.5, 167, 180

[56] References Cited

U.S. PATENT DOCUMENTS

| | | |
|---|---|---|
| D. 297,425 | 8/1988 | Markow . |
| D. 298,025 | 10/1988 | Markow . |
| D. 364,841 | 12/1995 | Brannan et al. . |
| 1,037,829 | 9/1912 | Howe ...................................... 152/288 |
| 1,042,592 | 10/1912 | O'Rear ..................................... 152/288 |
| 1,168,157 | 1/1916 | Brunnow .............................. 152/271 X |
| 1,280,198 | 10/1918 | Eriksen ..................................... 152/285 |
| 2,607,582 | 8/1952 | Jurgens ..................................... 267/1.5 |
| 4,127,166 | 11/1978 | Wyman . |
| 4,273,176 | 6/1981 | Wyman et al. . |
| 4,310,042 | 1/1982 | Wyman et al. . |
| 4,350,196 | 9/1982 | Hampshire . |
| 4,387,071 | 6/1983 | Kirkhuff . |
| 4,705,087 | 11/1987 | Markow . |
| 4,739,810 | 4/1988 | Markow . |
| 4,784,201 | 11/1988 | Palinkas et al. . |
| 5,353,853 | 10/1994 | Hansson . |

*Primary Examiner*—Russell D. Stormer
*Attorney, Agent, or Firm*—McDermott, Will & Emery

[57] ABSTRACT

An elastic element useful for constructing shock-absorbing devices, is elongated and continuously curved into an endless double-loop formation including an outer loop merging with an inner loop located within and offset from the plane of the outer loop. Also described are a number of applications for such elastic elements, including a non-pneumatic vehicle tire having an outer elastomeric body, and a plurality of said elastic elements within the outer elastomeric body for cushioning the shock applied thereto.

12 Claims, 10 Drawing Sheets

6,032,710

ELASTIC ELEMENT AND SHOCK-ABSORBING DEVICES, PARTICULARLY VEHICLE TIRES, CONSTRUCTED THEREWITH

FIELD AND BACKGROUND OF THE INVENTION

The present invention relates to elastic elements useful for constructing various types of shock-absorbing devices. The invention is particularly useful for constructing non-pneumatic vehicle tires and is therefore described below with respect to this application, but it will be appreciated from the description below that the invention is also useful for constructing other types of shock-absorbing devices, such as seismic shock absorbers for building structures, mechanical shock absorbers for machines, and the like.

Conventional vehicle tires of the pneumatic type suffer from a number of disadvantages, including the need to maintain a predetermined air pressure within the tire for optimum performance, and the danger of a catastrophic failure in the event of a leak or blowout, which could result in a serious accident. While conventional non-pneumatic tires are not subject to these disadvantages, they are much heavier than pneumatic tires, and provide considerably less shock absorption than pneumatic tires. Previous attempts have been made to produce non-pneumatic tires with elastomeric inserts in order to provide the foregoing advantageous characteristic of pneumatic tires, but insofar as we are aware, no such non-pneumatic tires have yet gained any widespread use.

OBJECTS AND BRIEF SUMMARY OF THE INVENTION

An object of the present invention is to provide an elastic element which is particularly useful for constructing shock-absorbing devices, particularly non-pneumatic tires, but also for constructing other shock-absorbing devices, such as foundations for building structures to absorb seismic shocks, machines to absorb mechanical vibrations, etc. Another object of the present invention is to provide a non-pneumatic tire constructed with the novel elastic elements; and further objects are to provide other shock-absorbing devices constructed with such elastic elements.

According to one aspect of the present invention, there is provided an elastic element useful for constructing shock-absorbing devices; said elastic element being elongated and continuously curved into an endless double-loop formation including an outer loop merging with an inner loop located within and offset from the plane of the outer loop.

According to further features in the described preferred embodiments, the outer surface of the inner loop is continuously spaced from the outer surface of the outer loop. Preferably, the elastic element is curved according to the following equations:

$$R(\theta) = R_m + r \cdot \cos(\theta/2); \quad (a)$$

$$Z(\theta) = r \cdot \sin(\theta/2) \quad (b)$$

wherein "$\theta$" varies from 0 to $4\pi$; "$r$" is the cross-section radius of the elastic element; and $R_m = (R_{max} + R_{min})/2$ According to another aspect of the present invention, there is provided shock-absorbing device including a plurality of elastic elements as described above, and retaining means for retaining the elastic elements in a toroidal configuration. A preferred form of retaining means is one which includes a helical element formed with a plurality of open loops engaging and tying together the plurality of elastic elements for retaining them in said toroidal configuration.

According to a further aspect of the present invention, the shock-absorbing device is a vehicle tire including an outer elastomeric body and having the plurality of elastic elements within the outer elastomeric body for cushioning the shock applied to the outer elastomeric body.

As will be described more particularly below, non-pneumatic vehicle tires may be constructed in accordance with the foregoing features to provide performance characteristics very comparable to pneumatic tires, without the disadvantages of pneumatic tires in the need for maintaining a predetermined tire pressure to provide optimum performance, and the danger of a catastrophic failure in the event of a leak or blowout.

While the elastic elements of the present invention are particularly useful for making non-pneumatic vehicle tires, they may be used for a number of other applications of elastic-type shock absorbers. One application described herein is in a foundation for building structures to absorb seismic shocks, and a further application is for machines to absorb mechanical vibrations.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
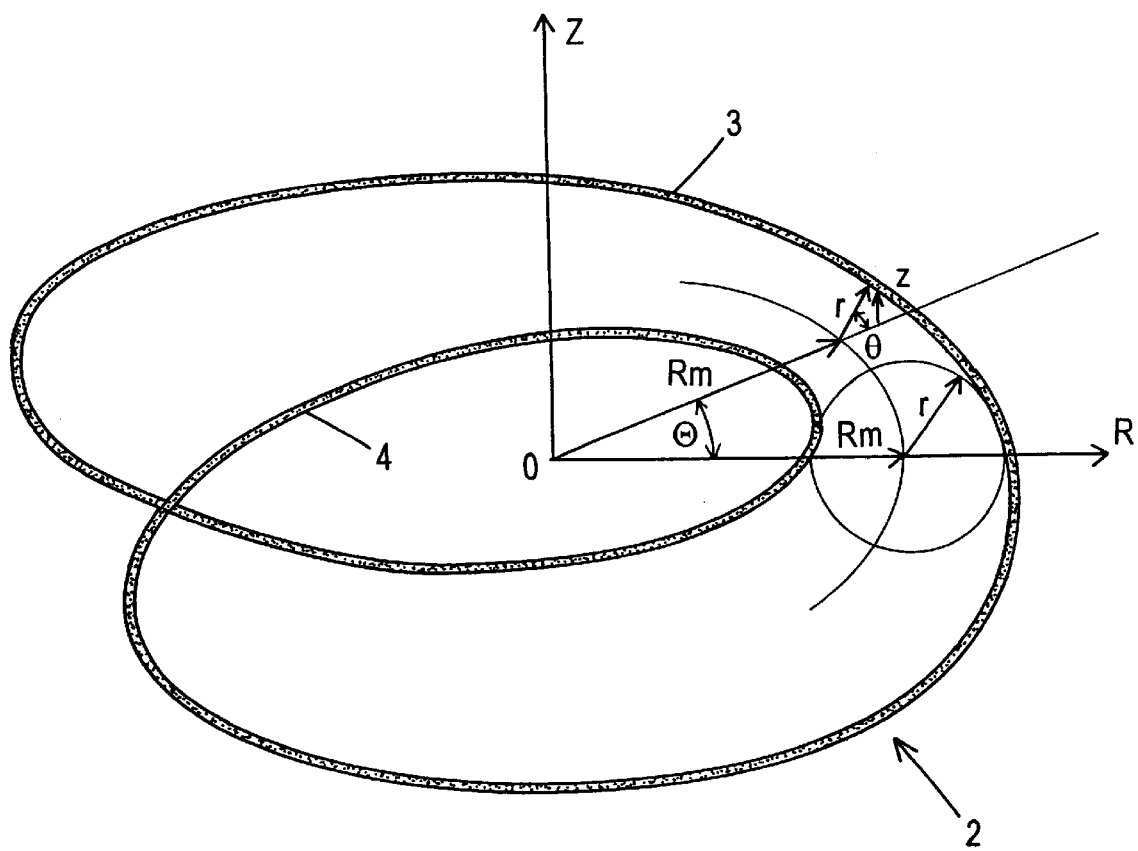
FIG. 1 is a three-dimensional view illustrating a preferred form of elastic element constructed in accordance with the present invention.

FIG. 1 illustrates the basic elastic element, therein generally designated 2, which is useful for constructing non-pneumatic vehicle tires and other types of elastic shock-absorbing devices in accordance with the present invention. The basic elastic element 2 is of an elongated configuration and is continuously curved into an endless double-loop formation, including an outer loop 3 merging with an inner loop 4 of smaller diameter than the outer loop and located within the circumference of, but offset from the plane of, the outer loop.

Figure 8:
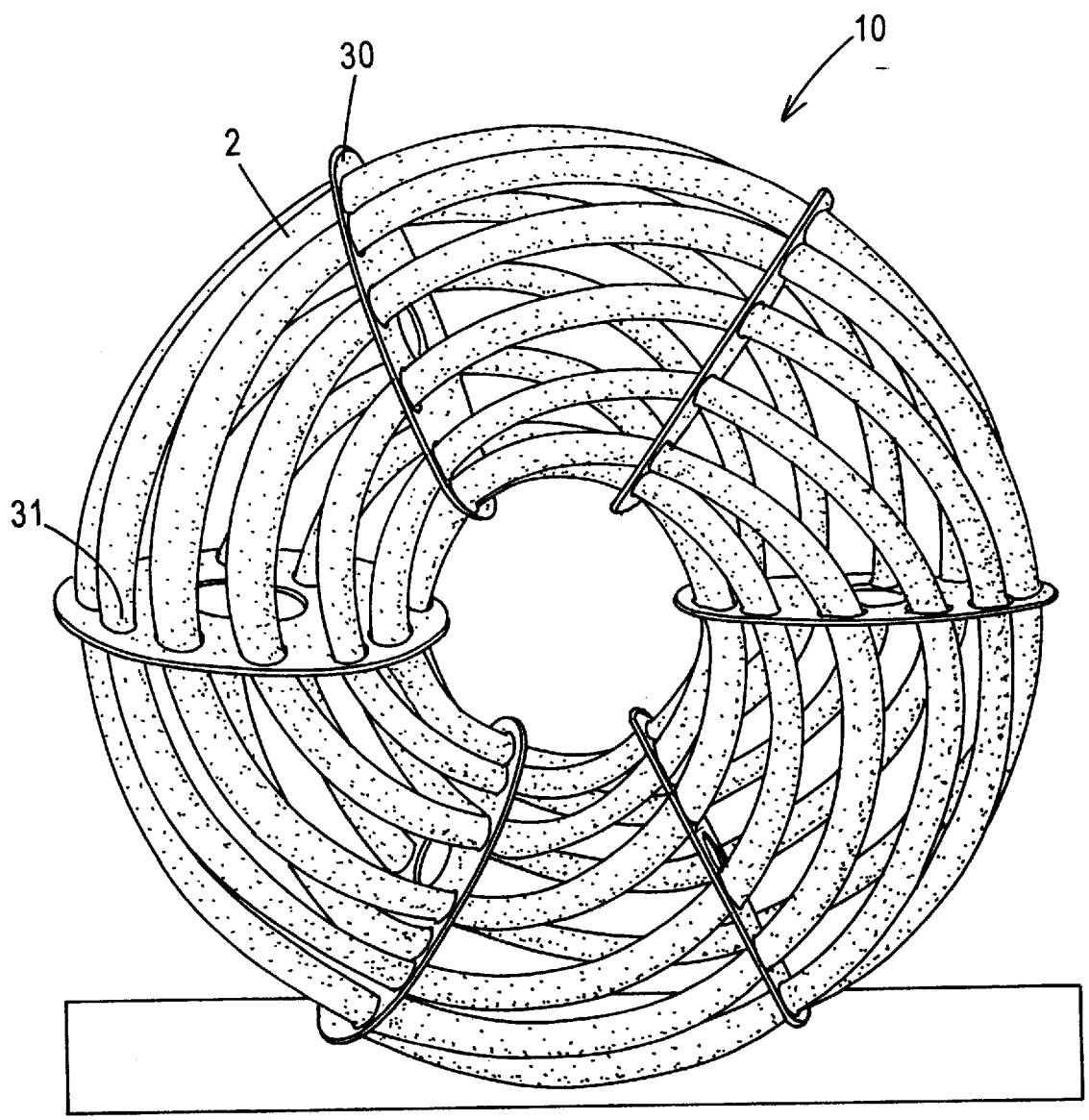
FIG. 8 is a three-dimensional view of an assembly of elastic elements, corresponding to that of FIG. 4, but illustrating different retaining means for retaining the elastic elements in a toroidal configuration.

Elastic element 2 illustrated in FIG. 1 can be constructed, for example, by forming an elastic element into a very large loop, then twisting the large loop into a "FIG. 8" configuration to define two loops of different diameters, and then moving the smaller loop within the circumference of the larger loop but offset from the plane of the larger loop. In producing the double-loop configuration illustrated in FIG. 1, the outer surface of the inner loop is not to contact the outer surface of the outer loop, but to remain continuously spaced from the outer surface of the outer loop.

FIG. 1 illustrates the three-dimensional polar coordinates defining the double-loop configuration of elastic element 2. This double-loop configuration may be defined by the following equations:

$$R(\theta) = R_m + r \cdot \cos(\theta/2); \text{ and} \quad (1)$$

$$Z(\theta) = r \cdot \sin(\theta/2) \quad (2)$$

where "$\theta$" is a variable ranging from "0" to "$4\pi$"; and "r" is the cross-section radius of the elastic element; and $R_m = (R_{max} + R_{min})/2$.

Figure 2A:
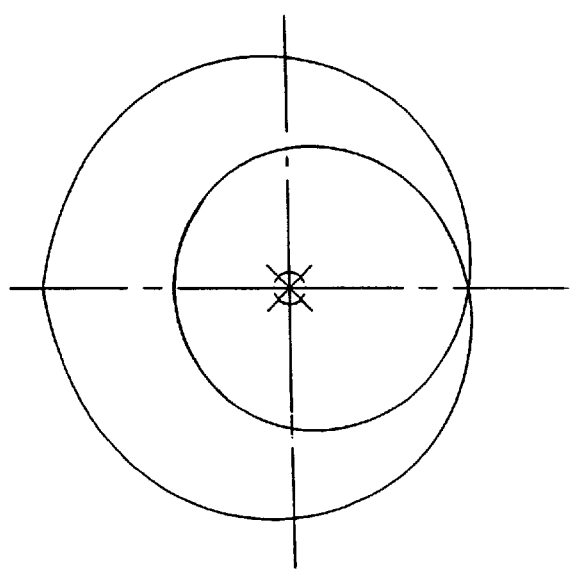
FIGS. 2a, 2b and 2c are front, side and top views, respectively, of the elastic element of FIG. 2.
Figure 2B:
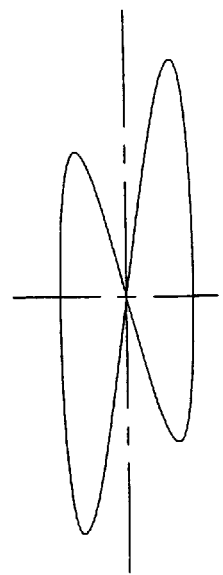
Figure 2C:
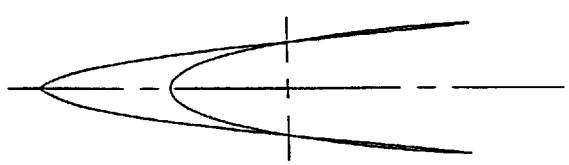
Figure 2:
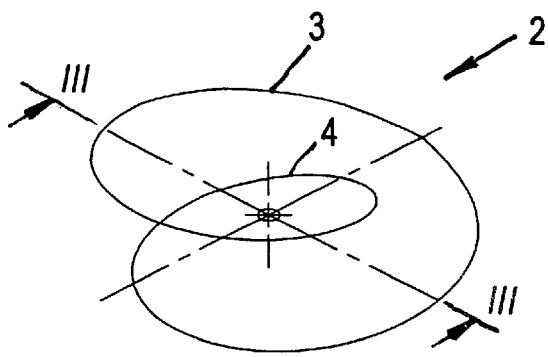
FIG. 2 is a three-dimensional projection of the elastic element of FIG. 1.
Figure 3:
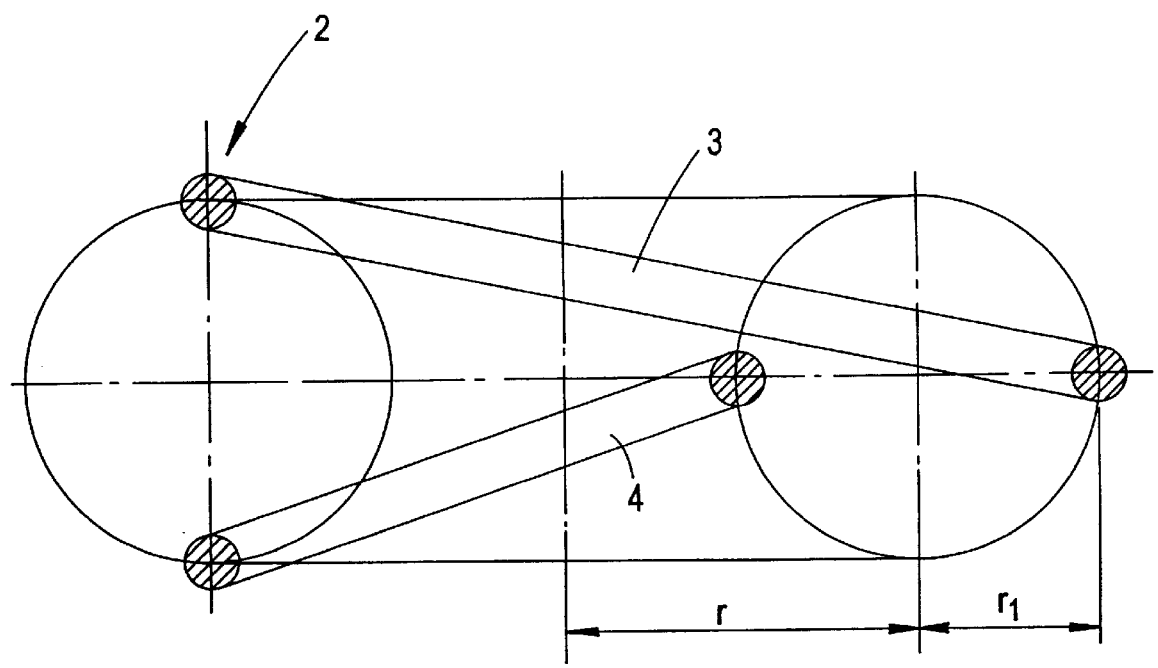
FIG. 3 is a sectional view along line III—III of FIG. 2.

FIGS. 2, 2a–2c and 3 will aid in better understanding the double-loop configuration of elastic element 2. Thus, FIG. 2 is a three-dimensional projection of elastic element 2; FIGS. 2a, 2b and 2c are front, side and top views, respectively, of elastic element 2 in FIG. 2; and FIG. 3 is a sectional view along line III—III of FIG. 2. As seen particularly in FIG. 2a, the two loops 3, 4 are both of circular configuration; and as seen in FIG. 3, no contact is made between the outer surfaces of the two loops throughout the complete lengths of these loops. Also, as seen in FIG. 3, elastic element 2 is of solid circular cross-section. FIG. 3 also more clearly illustrates the offset of the inner-loop 4 with respect to the plane of the outer loop 3.

Figure 4:
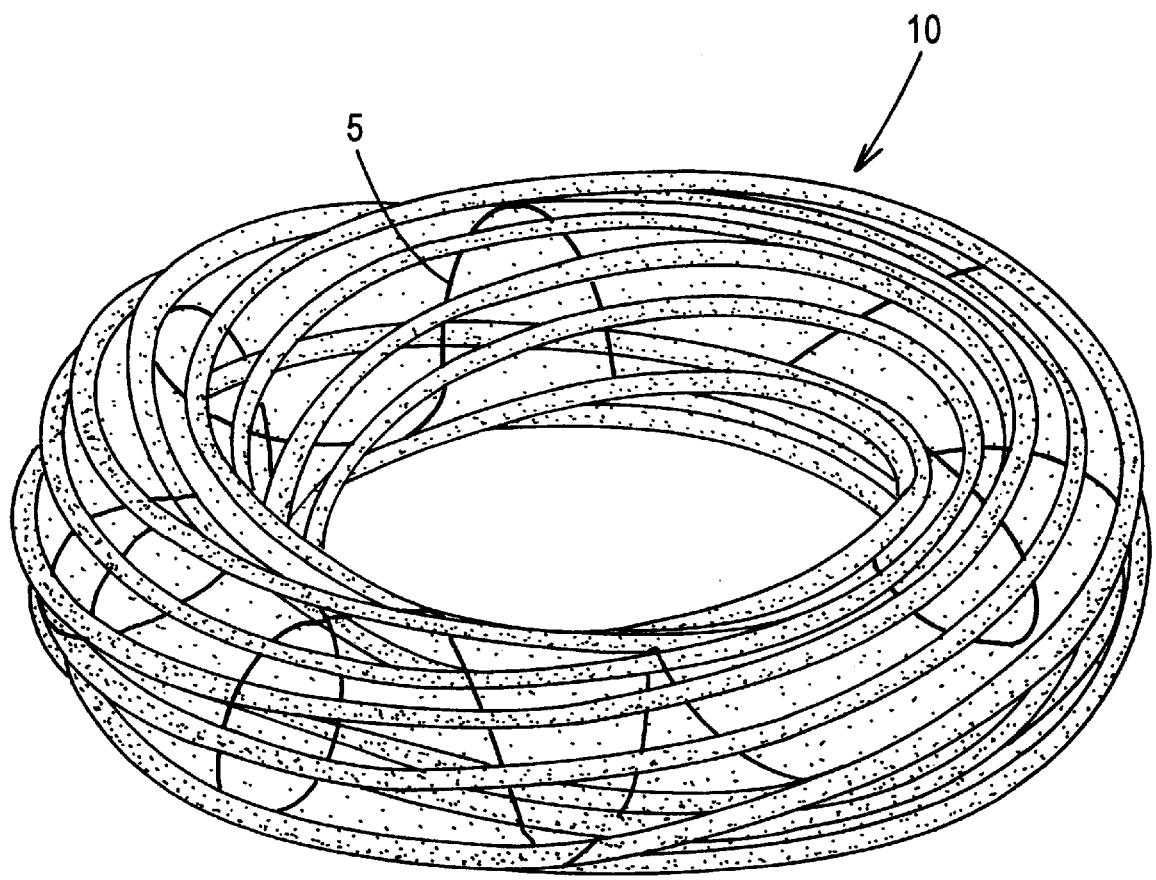
FIG. 4 is a three-dimensional view illustrating an assembly of six elastic elements, each as described above with respect to FIGS. 1–3, assembled in a toroidal configuration.
Figure 5A:
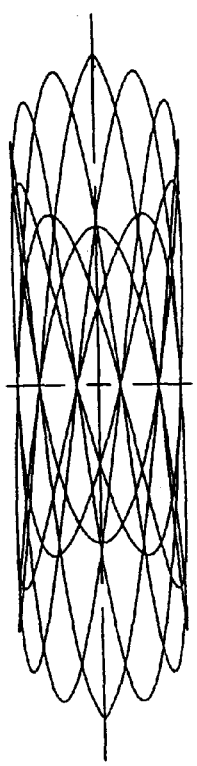
FIGS. 5a, 5b and 5c being top, front and side views, respectively, of the elastic-element assembly of FIG. 5.
Figure 5B:
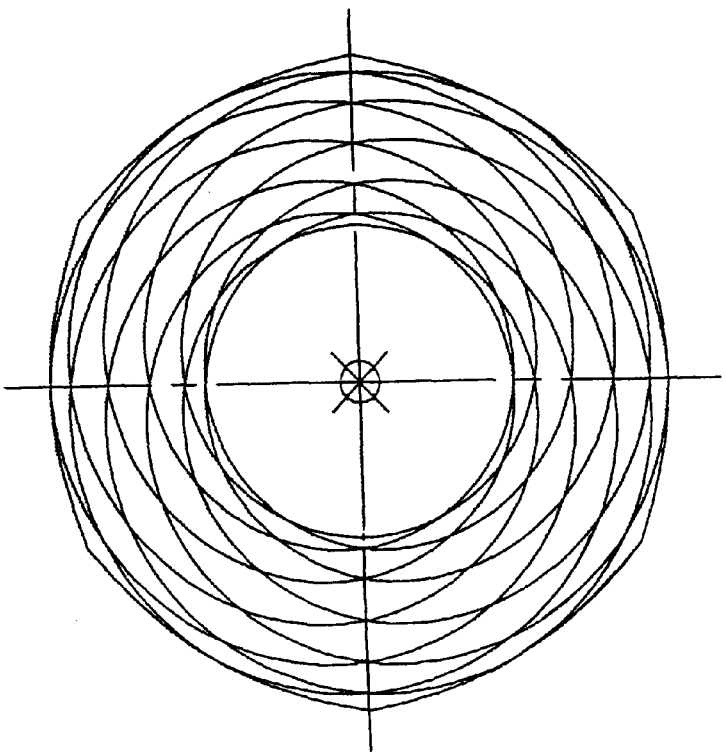
Figure 5C:
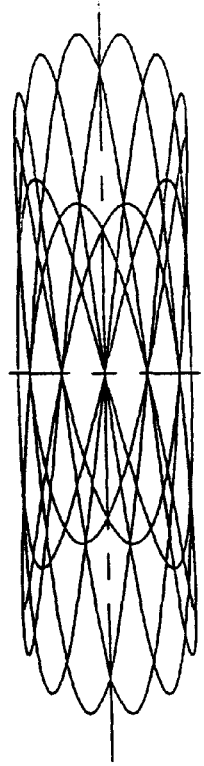
Figure 5:
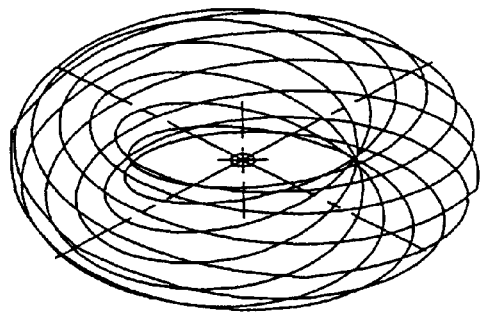
FIG. 5 is a three-dimensional projection of the elastic element assembly of FIG. 4.

While single elastic elements 2 is illustrated in FIGS. 1–3, could conceivably be used in shock-absorbing devices, such elements are particularly useful in producing shock absorbing devices having a plurality of such elastic elements retained in a toroidal configuration. FIG. 4 illustrates, at 10, an assembly of six such elements retained in a toroidal configuration by a helical element 5 formed with a plurality of open loops engaging and tying together the plurality of elastic elements 2 in the toroidal configuration. FIG. 5 diagramatically illustrates toroidal assembly 10 in a three-dimensional projection; and FIGS. 5a–5c illustrate this assembly in a top view (FIG. 5a), a side view (FIG. 5b), and an end view (FIG. 5c).

As indicated earlier, a particularly important application of the elastic elements 2 (FIGS. 1–3) and the toroidal assembly 10 of such elements (FIGS. 4–5) is in a non-pneumatic vehicle tire. Such a tire construction is illustrated in FIGS. 6 and 7, and therein generally designated 20.

Figure 6:
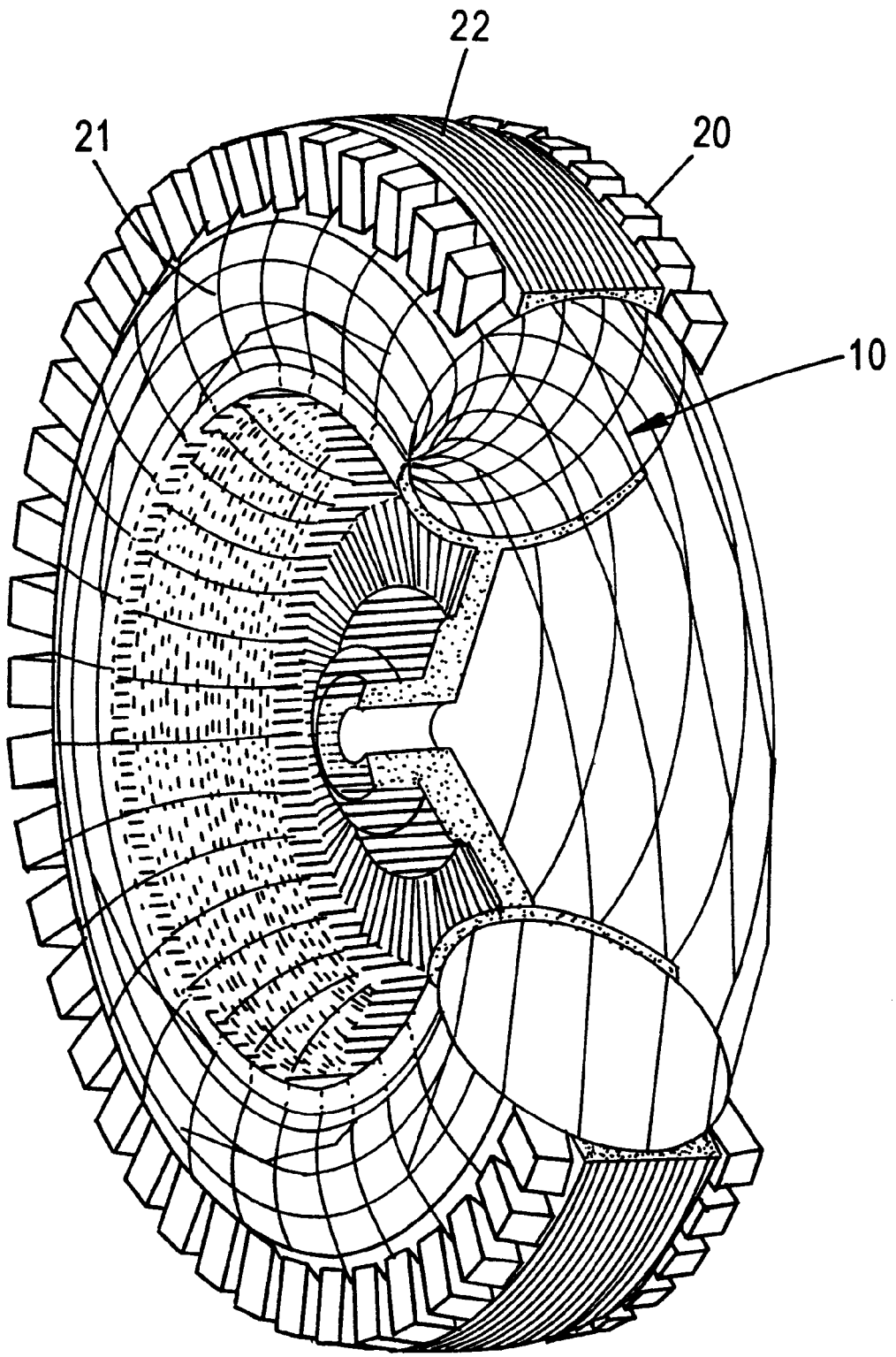
FIG. 6 illustrates the elastic element assembly of FIGS. 4 and 5 included in a non-pneumatic vehicle tire.
Figure 7:
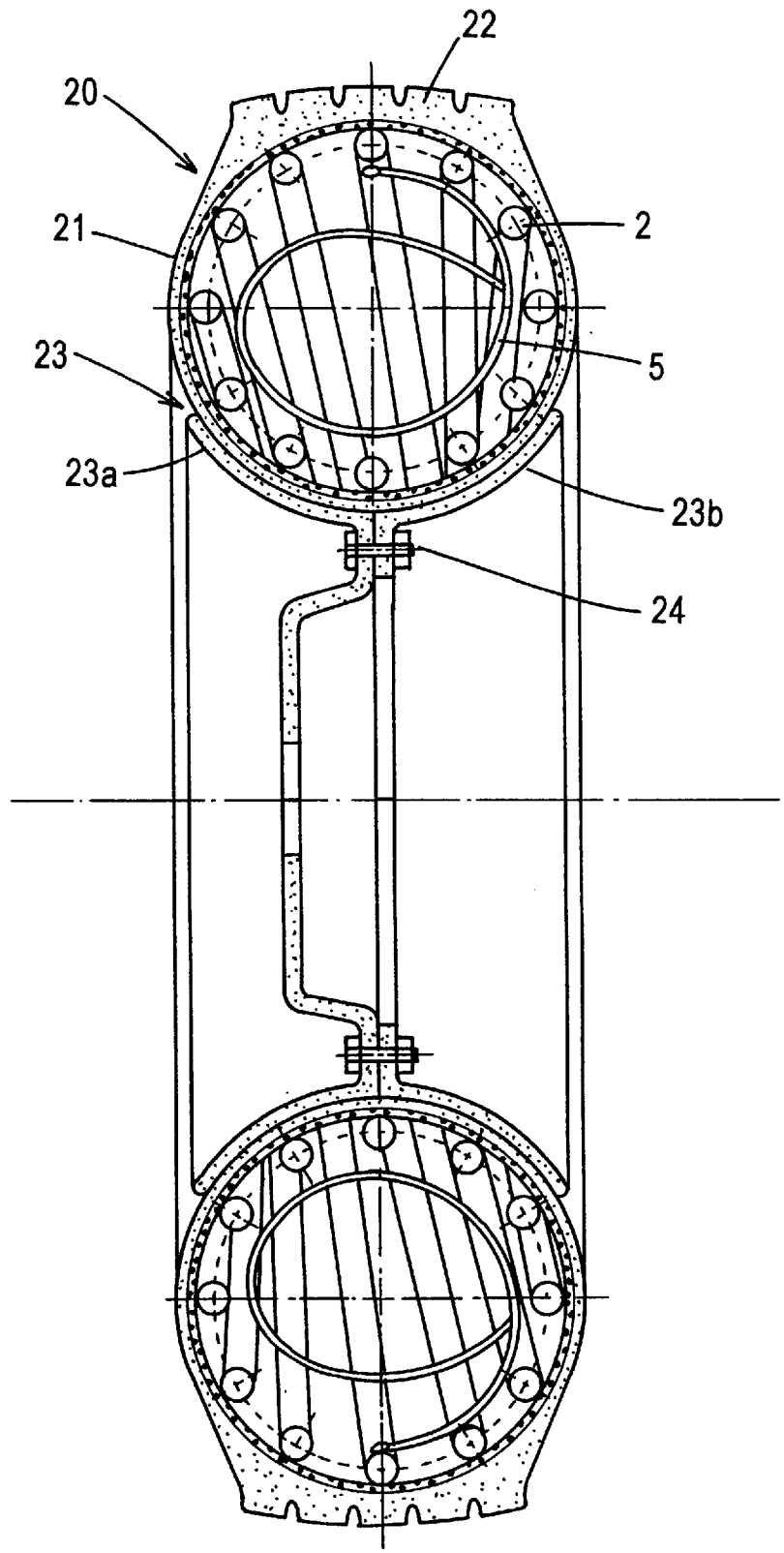
FIG. 7 more particularly illustrates the construction of the non-pneumatic vehicle tire of FIG. 6 and its rim.

Thus, the pneumatic tire 20 illustrated in FIGS. 6 and 7 includes a hollow tire body 21 of elastomeric material (e.g. natural or synthetic rubber) having an outer tread 22. The toroidal assembly 10, including a plurality (preferably six) elastic elements 2 retained in toroidal configuration by the helical element 5, is located within the elastomeric tire body 21. Preferably, the wheel rim, generally designated 23, is made of two sections 23a, 23b, bolted together by bolts 24.

A non-pneumatic tire constructed as illustrated in FIGS. 6 and 7 has been found to respond to the impact loads generated by the wheel rim in a manner comparable to a conventional pneumatic tire. Thus, the elastic element 2 in the toroidal assembly 10 are in a state of complex stress deformation such as to cushion the shocks applied to the tire as it rolls along the ground. On the other hand, such a non-pneumatic tire does not require maintenance of a predetermined air pressure for optimum performance, and is also not subject to catastrophic failure in the event of leakage or rupture, as in the conventional pneumatic tire.

The elastic elements 2 are made of strong elastic material, such as steel, titanium, fiberglass, carbon fibers, etc.

Model experiments of non-pneumatic vehicle tires constructed as described above have shown that the elastic elements, in the form of a steel tube of 10×1.5 mm diameter forming a tire of the size of the "Jeep™ 7.00–15 LT" tire, at radial loads of 1420 lb, undergo radial deformation of about 1 inch, which is 10% less than the deformation of the presently used jeep tire under forced excessive pressure of 3.2 kg/mm². When modeling the tire, the tread was not taken into account; otherwise, radial stiffness of the non-pneumatic tire is nearly the same as that of the JEEP™ tire, and the lateral deformation in contact areas are comparable.

FIG. 8 illustrates a toroidal assembly of six elastic elements 2, similar to that illustrated in FIG. 4 and therefore identified by the same reference numeral 10, except that instead of using a helical element (5) for retaining the elastic elements in the toroidal configuration, there are used a plurality of discs 30, spaced around the circumference of the toroidal assembly. For purposes of example, FIG. 8 illustrates six such discs 30, each formed with a plurality of openings 31 for receiving the elastic elements 2. Since there are six elastic elements 2 each including two loops (3, 4), each disc would be formed with twelve openings 31. Preferably, the discs 30 are also elastic to permit their elastic deformation when the toroidal assembly is used for absorbing shocks, as described above, and as to be described also below.

Figure 9:
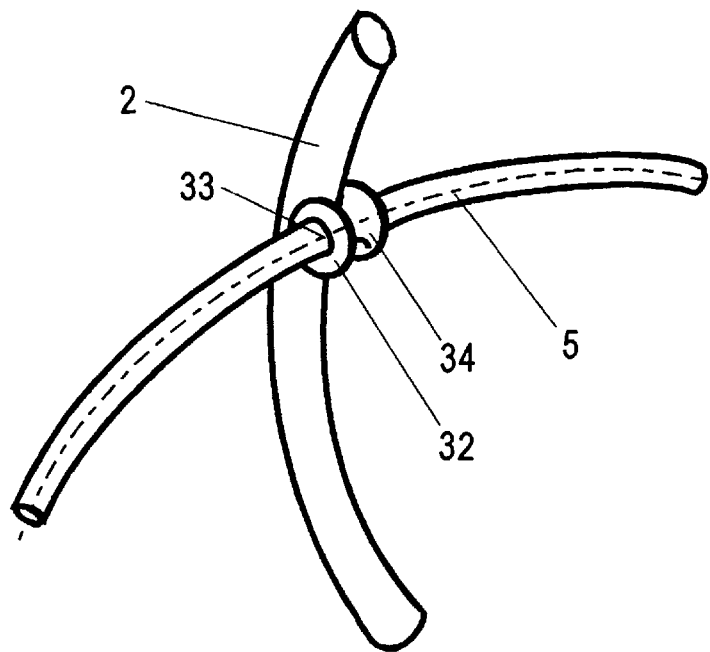
FIGS. 9 and 10 are fractional, three-dimensional views, illustrating two further types of retaining means which may be used for retaining the elastic element assembly in its toroidal configuration.

FIG. 9 illustrates another form of spacer elements for spacing the loops of the elastic elements 2 from each other. The construction illustrated in FIG. 9 also includes a helical elastic element 5 (corresponding to helical element 5 in FIG. 4), and a plurality of spacer elements 32. In this case, the spacer elements 32 are in the form of spools each including a central circular opening 33 for slidably receiving the helical elastic element 5, and an outer annular groove 34 for slidably receiving a portion of one of the elastic elements 2, preferably substantially perpendicular to the respective portion of elastic element 5.

Figure 10:
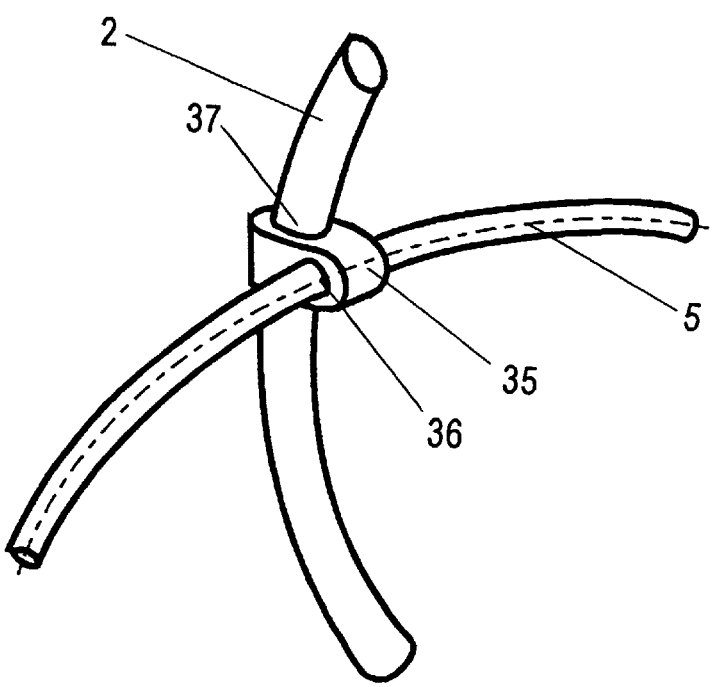

FIG. 10 illustrates another spacer element, therein designated 35, formed with two right-angle circular bores 36, 37. Bore 36 slidably receives the helical element 5, whereas bore 37 slidably receives the respective portion of an elastic element 2.

While the elastic elements 2 described above, and the toroidal assembly 10 of such elastic elements, are particularly useful in non-pneumatic tires as also described above, they may be used in other shock-absorbing applications. Examples of such other applications are illustrated in FIGS. 11 and 12.

Figure 11:
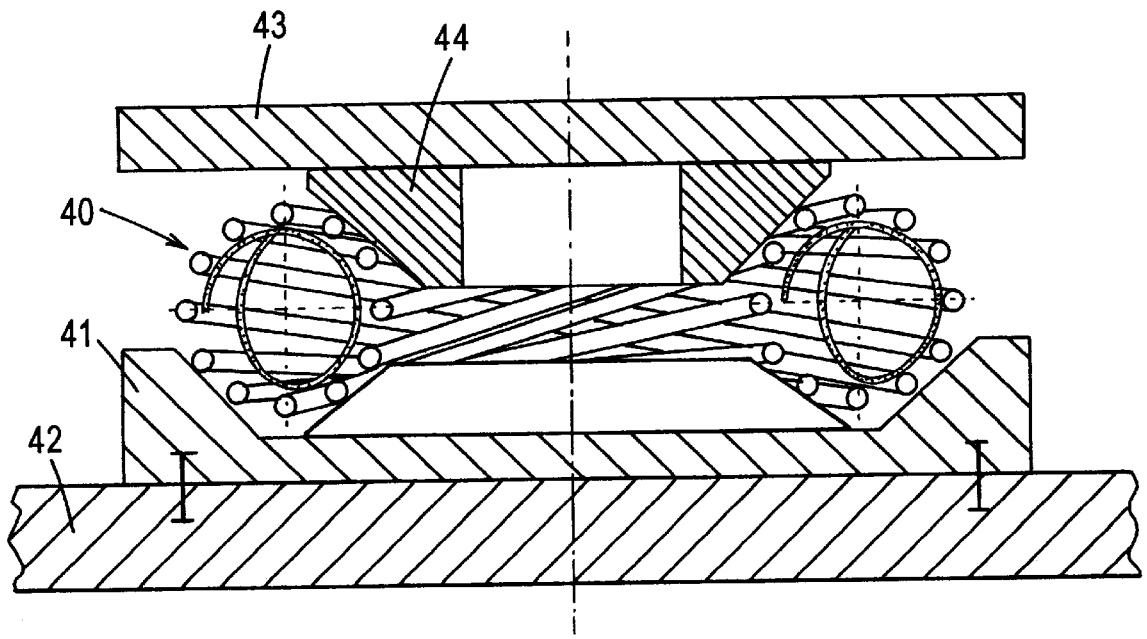
FIG. 11 is a sectional view illustrating the elastic element assembly in a shock absorbing device included in a foundation for supporting a building structure against seismic shocks.

FIG. 11 illustrates a shock-absorbing device to be included in a foundation for supporting a building structure to absorb seismic shocks. The illustrated shock absorbing device includes a toroidal assembly, generally designated 40, of elastic elements, corresponding to toroidal assembly 10 in FIG. 4, received within an annular socket formed in a holder plate or barrel 41 secured to a bed plate 42. As shown in FIG. 11, barrel 41 engages the outer surface of the toroidal assembly 40. The building column 43 is provided with a base 44 formed with an annular groove for receiving the inner face of the toroidal assembly 40. The arrangement is such that seismic shocks applied to the bed plate 42 are absorbed by the shock-absorbing toroidal assembly 40 before being transmitted to the building column 44.

Figure 12:
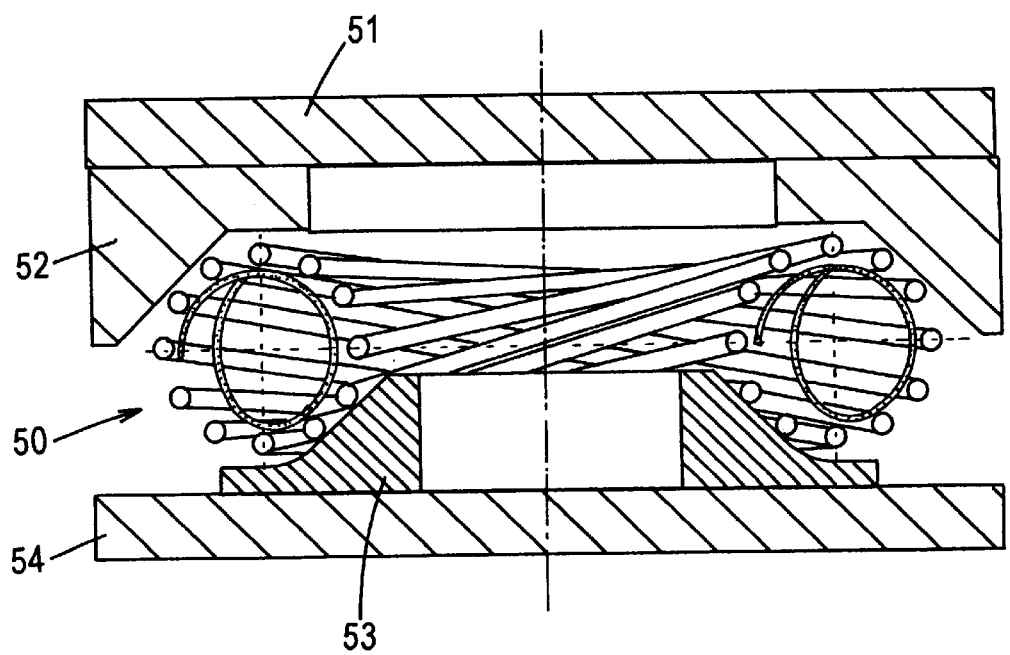
FIG. 12 is a sectional view illustrating the elastic element assembly used as a shock absorbing device in a machine for absorbing mechanical vibrations.

FIG. 12 illustrates the toroidal shock-absorbing assembly, therein designated 50, applied to a machine for absorbing mechanical vibrations. In this case, the mechanism producing the vibrations (not shown) is supported on plate 51 engaging one side of a barrel 52, the opposite side of the barrel being formed with an annular socket for engaging the outer surface of the toroidal shock-absorbing assembly 50. The inner surface of the shock-absorbing assembly 50 engages a base 53 in contact with a frame plate 54 of the machine such that mechanical vibrations produced by the mechanism on plate 51 at one side of the shock absorber, are absorbed by the toroidal assembly 50 before being transmitted to the frame plate 54 on the opposite side of the shock absorber.

While the invention has been described with respect to several preferred embodiments, it will be appreciated that these are set forth merely for purposes of example, and that many variations may be made. For example, the described embodiments utilizes six elastic elements for illustration purposes, but it will be appreciated that this umber could be increased or decreased according to the particular application. Many other variations, modifications and applications of the invention will be apparent.

What is claimed is:

1. An elastic element useful for constructing shock-absorbing devices; said elastic element being elongated and continuously curved into an endless double-loop formation Including an outer loop merging with an inner loop located within and offset from the plane of the outer loop;

wherein said elastic element is curved according to the following equations:

$$R(\theta) = R_m + r \cdot \cos(\theta/2); \text{ and} \qquad (a)$$

$$Z(\theta) = r \cdot \sin(\theta/2) \qquad (b)$$

wherein "$\theta$" varies from 0 to $4\pi$; and "r" is the cross-section radius of the elastic element.

2. A shock-absorbing device including a plurality of elastic elements each according to claim 1, and retaining means for retaining said plurality of elastic elements in a toroidal configuration.

3. The shock-absorbing device according to claim 2, wherein the outer surface of the inner loop of each of said elastic elements is continously spaced from the outer surface of the outer loop of the respective element.

4. The shock-absorbing device according to claim 2, wherein said retaining means includes a helical element formed with a plurality of open loops engaging and tying together the plurality of elastic elements for retaining them in said toroidal configuration.

5. The shock absorbing device according to claim 4, wherein said retaining means further includes a plurality of spacing elements carried by said helical elements and engageable with said elastic elements for spacing them from said helical element.

6. The shock absorbing device according to claim 5, wherein said spacing elements include spools received on the helical element each formed with an outer annular groove for receiving a said elastic element.

7. The shock absorbing device according to claim 5, wherein said spacing elements include connectors each formed with first and second bores perpendicular to each other, one of said bores receiving said helical element, and the other of said bores receiving a said elastic element.

8. The shock absorbing device according to claim 2, wherein said retaining means includes a plurality of discs having openings for receiving said plurality of elastic elements and for retaining them in said toroidal configuration.

9. The shock-absorbing device according to claim 2, wherein said shock-absorbing device is a vehicle tire including an outer elastomeric body, and housing said plurality of elastic elements within the outer elastomeric body for cushioning the shock applied to the outer elastomeric body.

10. The shock absorbing device according to claim 2, wherein said shock absorbing device is included in the foundation of a building structure to absorb seismic shocks applied to the building structure.

11. The shock-absorbing device according to claim 2, wherein said shock absorbing device is included in a machine to absorb mechanical vibrations applied to the machine.

12. A non-pneumatic vehicle tire including an outer elastomeric body, and a plurality of elastic elements within the outer elastomeric body for cushioning the shock applied thereto; each of said elastic elements being elongated and continuously curved into an endless double-loop formation including an outer loop merging with an inner loop located within and offset from the plane of the outer loop;

wherein each of said elastic elements is curved according to the following equations:

$$R(\theta) = R_m + r \cdot \cos(\theta/2); \text{ and} \qquad (a)$$

$$Z(\theta) = r \cdot \sin(\theta/2) \qquad (b)$$

wherein "$\theta$" varies from 0 to $4\pi$; and "r" is the cross-section radius of the elastic element.

* * * * *